US007730059B2

(12) United States Patent
Behnen et al.

(10) Patent No.: US 7,730,059 B2
(45) Date of Patent: Jun. 1, 2010

(54) CUBE FACETED DATA ANALYSIS

(75) Inventors: Marion Behnen, Austin, TX (US); Qi Jin, San Jose, CA (US); Timo Pfahl, San Jose, CA (US); Holger Pirk, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 11/693,717

(22) Filed: Mar. 30, 2007

(65) Prior Publication Data
US 2008/0243778 A1 Oct. 2, 2008

(51) Int. Cl.
*G06F 17/30* (2006.01)
(52) U.S. Cl. ............ 707/722; 707/737; 707/741; 707/956; 707/957; 707/958; 707/600
(58) Field of Classification Search ............. 707/3
See application file for complete search history.

(56) References Cited

U.S. PATENT DOCUMENTS

| | | | |
|---|---|---|---|
| 6,671,680 B1 | 12/2003 | Ivamoto et al. | |
| 6,831,668 B2 | 12/2004 | Cras et al. | |
| 7,007,029 B1 * | 2/2006 | Chen .................... | 707/100 |
| 7,120,646 B2 | 10/2006 | Streepy, Jr. | |
| 7,130,836 B2 | 10/2006 | Grosser et al. | |
| 7,496,568 B2 * | 2/2009 | Broder et al. ............ | 707/3 |
| 7,606,781 B2 * | 10/2009 | Sweeney et al. ......... | 706/48 |
| 2002/0087579 A1 | 7/2002 | Chasanoff et al. | |
| 2004/0044661 A1 | 3/2004 | Allen et al. | |
| 2004/0138935 A1 | 7/2004 | Johnson et al. | |
| 2004/0139102 A1 | 7/2004 | Vierich et al. | |
| 2005/0065955 A1 * | 3/2005 | Babikov et al. ......... | 707/101 |
| 2005/0080770 A1 | 4/2005 | Lueder et al. | |
| 2005/0283494 A1 | 12/2005 | Lueder et al. | |
| 2006/0004703 A1 | 1/2006 | Spivack et al. | |
| 2006/0026180 A1 | 2/2006 | Kres | |
| 2006/0053175 A1 | 3/2006 | Gardner et al. | |
| 2006/0074836 A1 | 4/2006 | Gardner et al. | |
| 2006/0218157 A1 | 9/2006 | Sonrov et al. | |
| 2006/0218159 A1 | 9/2006 | Murphy et al. | |
| 2006/0271565 A1 | 11/2006 | Acevedo-Aviles et al. | |
| 2006/0271568 A1 | 11/2006 | Balkir et al. | |

(Continued)

FOREIGN PATENT DOCUMENTS

JP          411015897 A          1/1999

OTHER PUBLICATIONS

Yee et al., "Faceted metadata for image search and browsing," in Proceedings of the 2003 Conference on Human Factors in Computing Systems, CHI 2003, 2003, pp. 401-408.*

(Continued)

*Primary Examiner*—James Trujillo
*Assistant Examiner*—William Spieler
(74) *Attorney, Agent, or Firm*—Patterson & Sheridan, LLP

(57) ABSTRACT

Methods, systems, and computer readable medium for displaying results of a search query. In one implementation, the method includes receiving a query, obtaining documents that satisfy the query, constructing a facet hierarchy based on documents that satisfy the query, creating a cube structure based on the facet hierarchy, and displaying a multi-dimensional search interface based on the cube structure.

30 Claims, 7 Drawing Sheets

U.S. PATENT DOCUMENTS

2006/0288039 A1 12/2006 Acevedo-Aviles et al.
2007/0136221 A1* 6/2007 Sweeney et al. .............. 706/20

OTHER PUBLICATIONS

Zeng et al., "Learning to cluster web search results," in Proceedings of the 27th Annual International ACM SIGIR Conference on Research and Development in Information Retrieval, SIGIR 2004, 2004, pp. 210-217.*

Sanderson et al., "Deriving concept hierarchies from text," in Proceedings of the 22nd Annual International ACM SIGIR Conference on Research and Development in Information Retrieval, SIGIR'99, 1999, pp. 206-213.*

Stoica et al., "Nearly-automated metadata hierarchy creation," in HLT-NAACL 2004: Short Papers, 2004, pp. 117-120.*

Lawrie et al., "Discovering and comparing hierarchies," in Recherche d'Information Assistee par Ordinateur (RIAO 2000), 2000, pp. 314-330.*

Dossier No. ARC 920050081, "Online Analytic Processing in the Presence of Uncertainties", 3 pages.

Toon Calders, et al., "Searching for Dependencies At Multiple Abstraction Levels, ACM Transactions On Database Systems", vol. 27, No. 3, Sep. 2002, pp. 229-260.

Bing Liu, et al., "Rule Interestingness Analysis Using OLAP Operations," KDD 2006, Aug. 20-23, 2006, pp. 297-306, Philadelphia, Pennsylvania, ACM 1-59593-339-5/06/0008.

Alfredo Cuzzocrea, "Providing Probabilistically-Bounded Approximate Answers To Non-Holistic Aggregate Range Queries in OLAP", pp. 97-106, DOLAP 2005, Nov. 4-5, 2005, Breman, Germany, ACM 1-59593-530-04/06/0011.

Riadh Ben Messaoud et al., "Enhanced Mining of Association Rules From Data Cubes", pp. 11-18, DOLAP 2006, Nov. 10, 2006, Arlington, US, ACM 1-59593-530-4/06/0011.

Zhang et al., "Cardinality-Based Inference Control in OLAP Systems: An Information Theoretic Approach", pp. 59-64m DOLAP 2004, Nov. 12-13, 2004, Washington, D.C., Copyright 2004 ACM 1-58113-977-2/04/0011.

Priebe, et al., "Towards Integrative Enterprise Knowledge Portals", pp. 216-223, CIKM 2003, Nov. 2-8, 2003, New Orleans, USA, ACM 1-58113-723-0/03/0011.

JP Abstract, JP411015897A.txt; "Interactive Data Analysis Supporting Device and Medium Recording Interactive Data Analysis Supporting Program"; 2 pages, Jan. 22, 1999, Fujitsu Limited.

Rtolap; Wikipedia the free encyclopedia, "RTOLAP—Real Time OLAP", 2 pages.

Josiane Mothe et al., DocCube: multi-dimensional visualization and exploration of large document sets, Journal of the American Society for Information Science and Technology, vol. 54, Issue 7, pp. 650-659, May 2003.

* cited by examiner

CUBE FACETED DATA ANALYSIS

FIELD OF THE INVENTION

The present invention relates generally to data processing, and more particularly to techniques for performing a search query in the context of cubed faceted analysis of data.

BACKGROUND OF THE INVENTION

Relational database systems have been developed to organize and store the data in a logical (structured) manner. An OLAP (Online Analytical Processing) database is a relational database system capable of handling queries more complex than those handled by standard relational databases. An OLAP database typically provides multidimensional access to data—i.e., views to data by several different criteria or "dimensions". An OLAP database typically considers each data attribute (such as product, sales region, and time period) as a separate dimension. An OLAP database manager can compute the intersection of a plurality of dimensions (such as all products sold in a given region during a given time period within a certain range of retail prices) and display the intersection. OLAP databases typically allow users to query complex data interrelationships, and discover previously unknown patterns and relationships between data.

Queries on an OLAP database are typically performed using a cube structure (referred to herein as "cube"). An OLAP cube consists of numeric facts called measures which are categorized by dimensions (such as a location dimension Country/Region/City, or a time dimension Hour/Minute/Second). Dimensions may be used to organize types of data into hierarchies with levels of detail, while measures may be used to measure quantities. To speed up analytical operations (such as drill-down, roll-up, and slice-and-dice operations) on an OLAP cube, a database management system developer (or database administrator) generally models a number of (static) cubes and loads data into the cubes. Static OLAP cubes, however, are inherently rigid which can limit their usefulness in many contexts.

Data that is not organized in a relational or even a structured manner, however, cannot generally be accessed using conventional OLAP database applications. Instead, faceted searches using a faceted search engine can be used to search both structured and unstructured data. Faceted searches are generally performed on a search index with taxonomies that reflect the categories associated with the data. A taxonomy in this context is a categorization scheme for data where the facets and facet elements which are derived from the taxonomy guide the search, and a posting list of records is associated with each facet element. The resulting documents for a particular search are organized in a facet tree including one or more facets. A facet is a node in the facet tree, and a facet may have any number of facet elements (or child facets). The total number of records in a facet is the sum total of all records in the posting lists of the facet elements beneath the facet in the facet tree. Selection of a facet (a range, word, or phrase) causes the faceted search engine to present the next set of facets, and so on along the facet tree until a final facet, the lowest-level categorization for a facet, is reached. When the user selects one of the facet nodes, the documents on the associated posting list for the facet node are displayed. Unlike queries on an OLAP database, faceted searches are typically on independent dimensions and do not support typical OLAP tasks, like slice-and-dice operations.

BRIEF SUMMARY OF THE INVENTION

In general, in one aspect, this specification describes a computer-implemented method for displaying results of a search query. The method includes receiving a query, obtaining documents that satisfy the query, constructing a facet hierarchy based on documents that satisfy the query, creating a cube structure based on the facet hierarchy, and displaying a multi-dimensional search interface based on the cube structure.

Particular implementations can include one or more of the following features. Obtaining documents that satisfy the query can include using a search index to obtain the documents, in which the search index stores information relating to a plurality of documents and the information includes metadata describing a hierarchical relationship among the plurality of documents. Constructing a facet hierarchy can include constructing a facet hierarchy based on the metadata describing the hierarchical relationship associated with the documents that satisfy the query. Displaying the multi-dimensional search interface can include displaying an OLAP (Online Analytical Processing) interface. The facet hierarchy can include a plurality of facets. Creating the cube structure can include creating dimensions for the cube structure based on the plurality of facets. Creating the cube structure can further include populating the cube structure with a plurality of measures, in which each measure is categorized by one or more dimensions of the cube, and each measure of the cube structure is based on documents classified by facets that correspond to the one or more dimensions categorizing the measure.

Displaying the multi-dimensional search interface can include constructing a multi-dimensional search query on the cube structure to select measures for display in the multidimensional search interface. The selected measures can be based on the documents that satisfy the query. The method can further include displaying a faceted search interface based on the facet hierarchy. Receiving the query can include receiving user input issuing a natural language word search through a user interface. The faceted search interface and the multi-dimensional search interface can be displayed in the user interface. The method can further include receiving a second query, and updating or deleting the cube structure responsive to receiving the second query.

In general, in another aspect, this specification describes a computer-implemented method for displaying results of a search query. The method can further include receiving a query and obtaining documents that satisfy the query using a search index. The search index stores information relating to a plurality of documents, and the information includes metadata describing a hierarchical relationship among the plurality of documents. The method can further include constructing a facet hierarchy based on the metadata describing the hierarchical relationship associated with the documents that satisfy the query, determining whether a pre-defined cube structure corresponds to the facet hierarchy, and responsive to pre-defined cube structure not corresponding to the facet hierarchy, modifying the pre-defined cube structure to correspond with the facet hierarchy, and displaying a multi-dimensional search interface based on the modified cube structure.

Particular implementations can include one or more of the following features. The method can further include displaying the multi-dimensional search interface based on the pre-defined cube structure if the pre-defined cube structure corresponds to the facet hierarchy. The facet hierarchy can include a plurality of facets, and the pre-defined cube structure can include pre-defined dimensions. Determining whether the pre-defined cube structure corresponds to the facet hierarchy can include determining whether each facet of the facet hierarchy maps to a pre-defined dimension of the pre-defined cube structure. The pre-defined cube structure can further include a plurality of pre-defined measures. Modifying the pre-defined cube structure can include re-calculating a pre-defined measure based on documents that satisfy the query. The method can further include displaying the facet hierarchy in a faceted search interface.

In general, in another aspect this specification describes a computer readable medium containing program instructions, tangibly stored thereon, for displaying results of a search query. The program instructions comprises instructions for receiving a query, obtaining documents that satisfy the query, constructing a facet hierarchy based on documents that satisfy the query, creating a cube structure based on the facet hierarchy, displaying a multi-dimensional search interface based on the cube structure and a faceted search interface based on the faceted search results.

In general, in another aspect this specification describes a computer readable medium containing program instructions, tangibly stored thereon, for displaying results of a search query. The program instructions comprise instructions for receiving a query and obtaining documents that satisfy the query using a search index. The search index stores information relating to a plurality of documents, and the information includes metadata describing a hierarchical relationship among the plurality of documents. The program instructions further comprise instructions for constructing a facet hierarchy based on the metadata describing the hierarchical relationship associated with the documents that satisfy the query, determining whether a pre-defined cube structure corresponds to the facet hierarchy, and responsive to pre-defined cube structure not corresponding to the facet hierarchy, modifying the pre-defined cube structure to correspond with the facet hierarchy, and displaying a multi-dimensional search interface based on the modified cube structure and a faceted search interface based on the faceted search results.

In general, in another aspect this specification describes a data processing system for displaying results of a search query. The data processing system comprises a user interface to receive a query, a search engine to obtain documents that satisfy the query, a facet service to construct a facet hierarchy based on documents that satisfy the query, a cube service to create a cube structure based on the facet hierarchy, a multi-dimensional search interface to display data associated with the documents that satisfy the query (the data being displayed based on the cube structure), and a faceted search interface to display data based on the faceted search results.

In general, in another aspect this specification describes a data processing system for displaying results of a search query. The data processing system comprises a user interface to receive a query, a search engine to obtain documents that satisfy the query, a facet service to construct a facet hierarchy based on documents that satisfy the query, and a cube service to determine whether a pre-defined cube structure corresponds to the facet hierarchy. Responsive to pre-defined cube structure not corresponding to the facet hierarchy, the cube service modifies the pre-defined cube structure to correspond with the facet hierarchy. The data processing system further includes a multi-dimensional search interface to display data associated with the documents that satisfy the query based on the modified cube structure.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

The present invention relates generally to data processing, and more particularly to techniques for performing a search query. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

Figure 1:
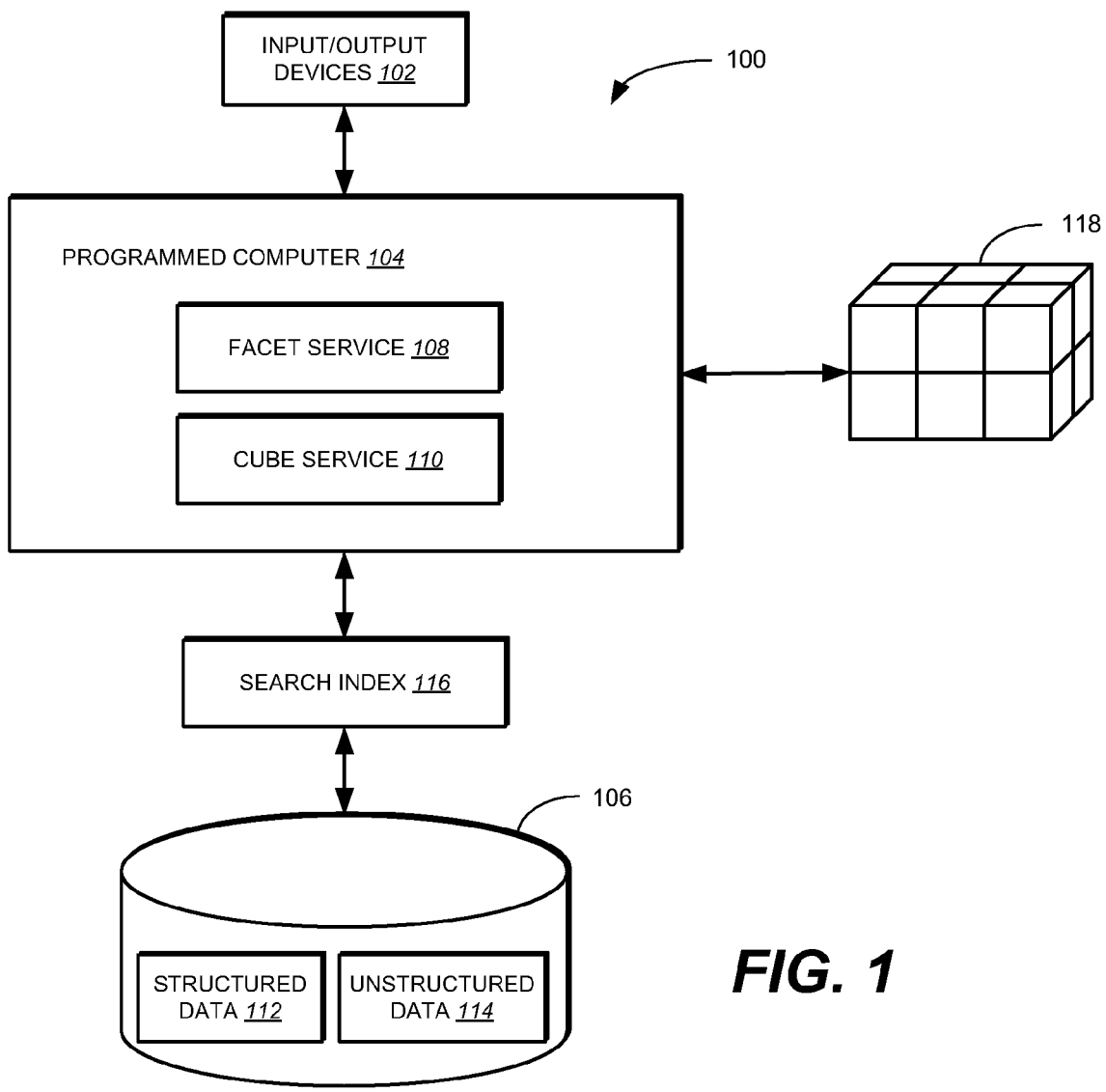
FIG. 1 is a block diagram of a system in accordance with one implementation of the invention.

FIG. 1 illustrates a data processing system 100 in accordance with one implementation of the invention. The data processing system 100 includes input and output devices 102, a programmed computer 104, and a storage device 106. The input and output devices 102 can include devices such as a printer, a keyboard, a mouse, a digitizing pen, a display, a printer, and the like. The programmed computer 104 can be any type of computer system, including for example, a workstation, a desktop computer, a laptop computer, a personal digital assistant (PDA), a cell phone, a network, and so on.

Running on the programmed computer 104 are a facet service 108 and a cube service 110. The facet service 108 and cube service 110 are software components that assist users in managing and accessing structured and/or unstructured data (e.g., structured data 112 and unstructured data 114 within the storage device 106). In particular, in one implementation, the facet service 108 and cube service 110 improve user access to data by combining both the navigational paradigms of faceted search and cube-based analyses. The cube-based analyses can be based on an ad-hoc generated cube or a static cube, as discussed in greater detail below.

In one implementation, to enable a search engine (not shown) to quickly locate data within the storage device 106, the data processing system 100 includes a search index 116 that indexes both the structured data 112 and unstructured data 114. In general, (in one implementation) there is no inherent limitation of the kind of data that can be indexed within the search index 116 as long as the data is accessible with, e.g., a relational or text-based access function. Accordingly, the data within the storage device 106 can be, for example, relational data or Extensible Markup Language (XML)-structured or unstructured text documents. In one implementation, the term document refers to the smallest unit that can be returned as a result—e.g., a text document, a note, an e-mail, a row of data from a fact table, an XML tagged data structure, or the like. In one implementation, the search index 116 is annotated with metadata that is used to construct a facet hierarchy. For this purpose, both the individual data attributes that categorize a given document, as well as the hierarchical relationship among the documents are contained within the metadata.

Figure 2A:
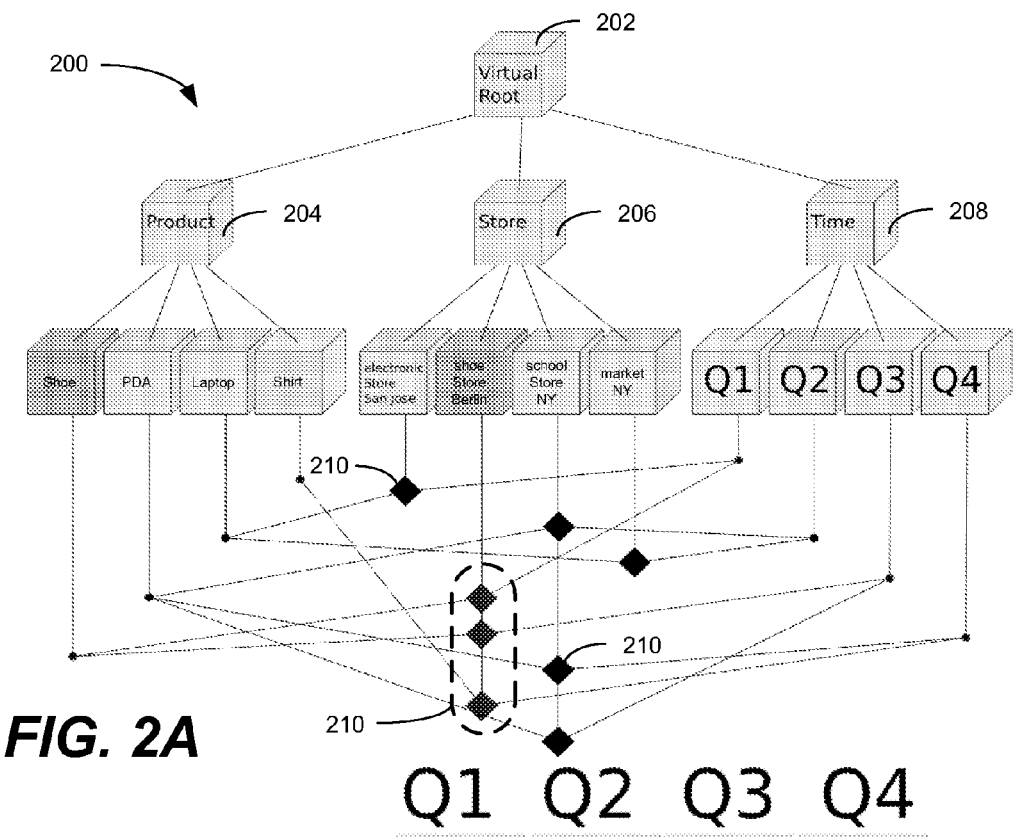
FIG. 2A illustrates an example facet hierarchy.

In operation, the programmed computer 104 receives a query (or search request) for data within the storage device 106. The query can be received through, e.g., a user interface displayed on a display coupled to the programmed computer 104. A plurality of documents that satisfy the query are obtained (e.g., through a search engine using the search index 116). In one implementation, the facet service 108 constructs a facet hierarchy based on the metadata associated with each of the documents that satisfy the query. FIG. 2A illustrates an example facet hierarchy 200 including a plurality of facets. More specifically, the facet hierarchy 200 includes a virtual root facet 202, a product facet 204, a store facet 206, and a time facet 208. The product facet 204 is a parent facet to child facets "Shoe", "PDA" (personal digital assistant), "Laptop", and "Shirt". The store facet 206 is a parent facet to child facets "electronic Store San Jose", "shoe Store Berlin", "school Store NY", and "market NY". The time facet 208 is a parent facet to child facets "Q1", "Q2", "Q3", and "Q4". Each diamond 210 in the facet hierarchy 200 represents a document.

Figure 2B:
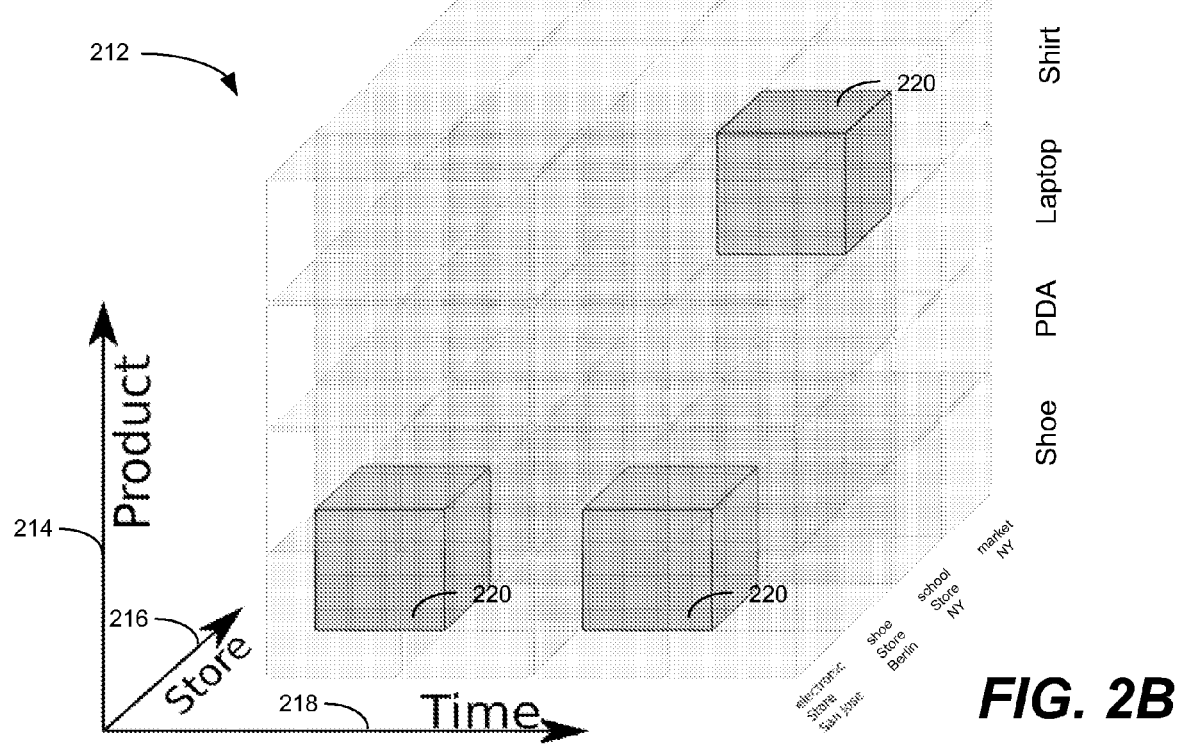
FIG. 2B illustrates a cube structure corresponding to the facet hierarchy of FIG. 2A.

The facets associated with the facet hierarchy are used to either create cube dimensions (on-the-fly) for a newly created cube (e.g., cube 118 of FIG. 1) or to map to existing cube dimensions of a static cube. For example, referring to FIGS. 2A and 2B, the facet hierarchy 200 can be interpreted (e.g., created or mapped) to a cube structure 212 having a cube dimension hierarchy (as shown in FIG. 2B). In particular, the product facet 204, the store facet 206, and the time facet 208 (of the facet hierarchy 200) respectively correspond to a product dimension 214, a store dimension 216, and a time dimension 218. Similarly, each child facet in the facet hierarchy 200 has a corresponding cube dimension level within the cube structure 212. The diamonds 210 (or documents) indicated by dashed lines within the facet hierarchy 200 correspond to measures 220 within the cube structure 212. Thus, in one implementation, the static (or ad-hoc) cube structure and the facet hierarchy can be used to respectively display the results of a query in a multi-dimensional search interface and a flexibly-ordered dynamic search interface. The multi-dimensional search interface can be an OLAP interface, and the flexibly-ordered dynamic search interface can be a faceted interface where data is categorized into facets for analysis.

Searchable Ad-Hoc Cubes

Figure 3:
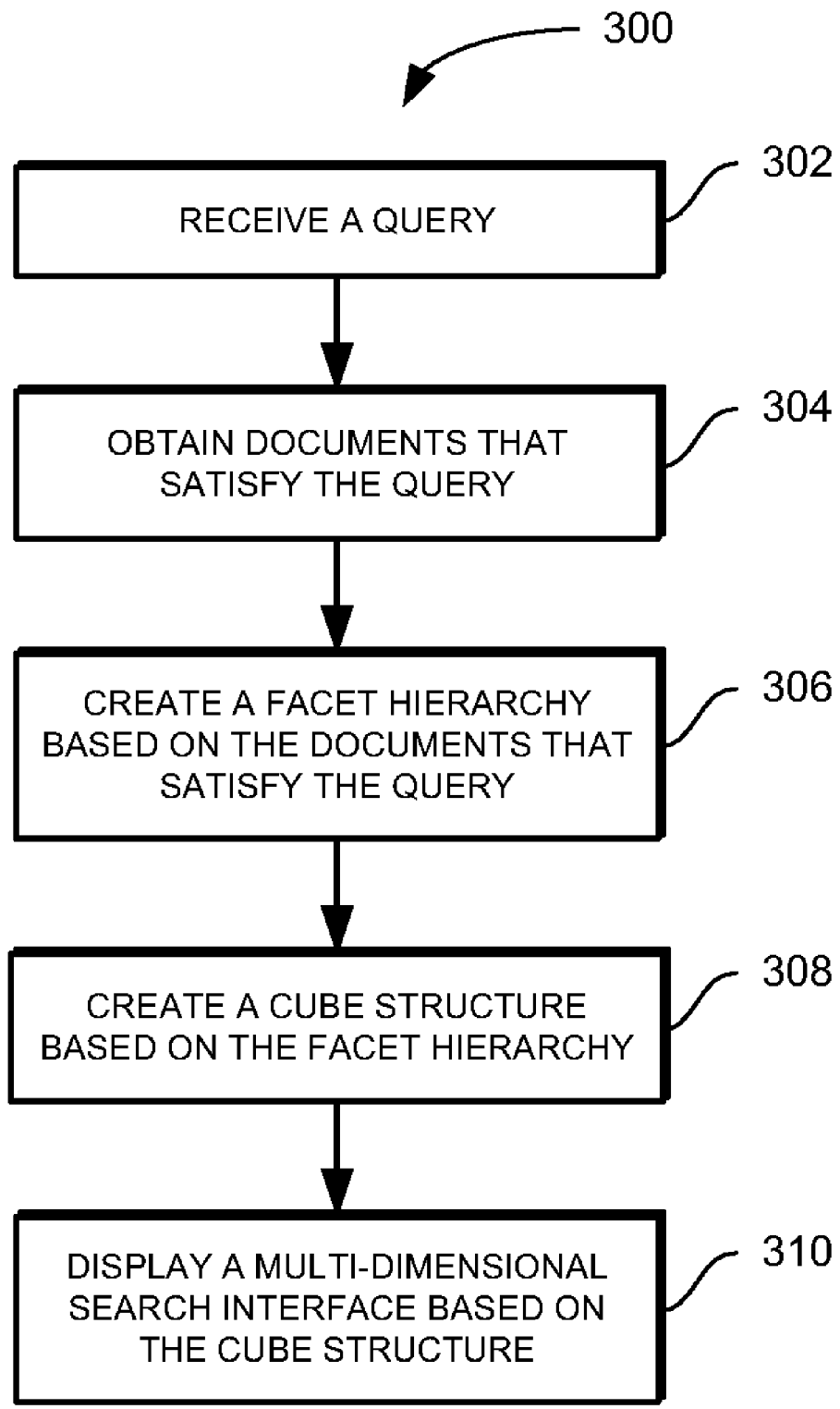
FIG. 3 illustrates a method for displaying results of a search query in accordance with one implementation of the invention.

FIG. 3 illustrates a method 300 for performing a query using on-the-fly (ad-hoc) created cubes according to one implementation. The method 300 begins with receiving a query on a given data set (e.g., data contained within storage device 106) (step 302). The query can be received from a user (e.g., through a user interface) or be received from a computer application. In one implementation, the query is a natural language word search.

In one implementation, prior to issuance or receipt of a query, the data set that is to be searched by the query is tagged to define a hierarchical relationship (e.g., a facet hierarchy) between the data in the data set. In one implementation, facet definitions with one or more levels are used to annotate structured and/or semi- or unstructured data. The facet definitions can refer to categories such as dimensions or to values resulting in measure ranges, and include a reference to a source of the related measures. For example, with respect to relational data sets, one or more keys (or elements of a compound key) can be identified that uniquely identifies a data row. In one implementation, the keys that are identified are those keys having a value of a finer granularity relative to related keys having values of a courser granularity. For example, with regard to keys that are related to (or categorized under) time, keys that correspond to minutes are identified over keys that correspond to hours, as the keys that correspond to minutes can be aggregated to represent an hour. Thus, in this implementation, there is not a need (after a query has been issued) for the method 300 to detect a hierarchy associated with a given data set, as the hierarchy of the data is already predefined for any given category. Accordingly, the search performance of such an implementation is increased over conventional techniques that may require a detection of a hierarchy associated with a given data set after a query has been issued.

Referring to FIG. 3, documents are obtained that satisfy the query (step 304). In one implementation, the documents that satisfy the query are obtained through a search engine using a search index (e.g., search index 116). A facet hierarchy is created (e.g., through facet service 108) based on the documents that satisfy the query (step 306). In one implementation, the search engine returns the results (i.e., documents that satisfy the query) organized in a facet tree structure (e.g., a facet hierarchy as shown in FIG. 2A). A cube structure is created (e.g., by cube service 110) based on the facet hierarchy (step 308). In one implementation, the facet tree structure is mapped into a hierarchical cube structure by respectively using each facet and corresponding child facet(s) as cube dimensions and corresponding cube dimension levels. The members of the facets are used to populate corresponding members of the cube dimensions.

If the measures of interest are available via a result document, the values in the cube cells (which have been constructed in the cube according to the structured members in the facet tree) are calculated according to the measure definition with a grouping according to the cell boundaries. For example, a measure "Sales Amount" might be summed up (aggregated) with sums on each level of a cube dimension (or each node in the facet tree). The values can be counts or other document metadata, or can be any measures which have been stored in the search index. If, however, the measures of interest are not available via a result document, for example, to avoid staleness of values, (in one implementation) the measures can instead be sourced from another data source. This implies, that the measures which are used to populate the cube cells, are retrieved with an additional query. For this purpose the facet definitions are associated with a measure definition that refers to the measure source and contains key definitions to match search results and measures, that is, each element of the unique key that identifies a document is added to the search index metadata for the document.

In general, (in one implementation) for a given query, the search result returns the facet categories, which are used to construct the cube as described above, as well as the documents with their key feature tags. The content of each cube cell is calculated via the current values determined through the identifying keys for all documents in a group. For example, with respect to a search index built on star schema, the keys to a given fact table row are associated as document features with the document that represents the fact table row. When this document is retrieved as part of a search result, the keys are used to fetch the measures from the fact table. For performance reasons, depending on the distribution of members in the relevant facets identified during a search, a parent level might be used to represent corresponding descendents, or the result might be mapped into a collection of sub-cubes to limit memory requirements.

A multi-dimensional search interface is displayed based on the cube structure (step 310). An example of a multi-dimensional search interface is an OLAP interface. The multi-dimensional search interface permits a user to perform cube-based analyses on the results returned by the search query. In addition, in one implementation, a user can refine or broaden an initial search request by performing drill-down or drill-up operations, or a slice-and-dice operation, within the multi-dimensional search interface.

Searchable Static Cubes

Figure 4:
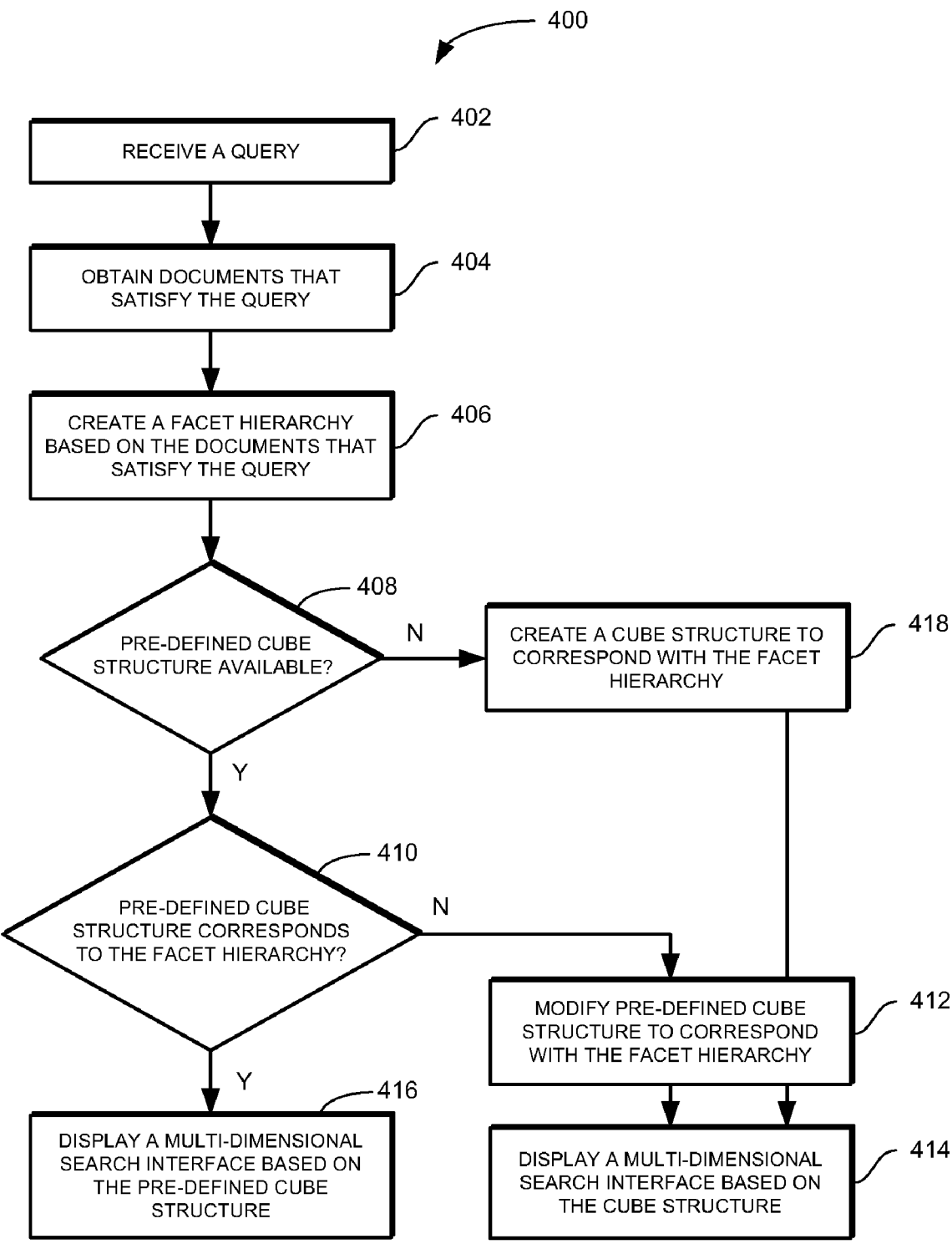
FIG. 4 illustrates a method for displaying results of a search query in accordance with one implementation of the invention.

FIG. 4 illustrates a method 400 for performing a query using one or more static cubes according to one implementation. In one implementation, the one or more static cubes are built a priori for selected dimensions from structured, but not necessarily relational, fact data. In this implementation, detailed definition of all relevant cube objects—e.g., dimension attributes, dimension levels, measures, and the connection between fact data and dimension data to identify the measure values for each dimension level—are predefined. In one implementation, each (static) cube structure is strictly hierarchical for each dimension—i.e., each lower level (or child) dimension is identified as belonging to a particular higher level (or parent) dimension by using a hierarchical concatenation of ancestor keys associated with the lower level dimensions.

In one implementation, a search index is built such that the search index includes at least one facet based on measures available in the fact data in addition to the facets based on a set or subset of dimensions and dimension levels. The dimension-based facets map to the members of a dimension, while measure-based facets are created depending on the value ranges. In one implementation, each data attribute that is used as a dimension level key for searchable levels, including the data attributes that are used as parent level keys, are added to the search index metadata. Each element of a compound key which uniquely identifies a given document is also added to the search index metadata.

The method 400 begins with receiving a query on a given data set (e.g., data contained within storage device 106) (step 402). As in method 300, the query can be received from a user (e.g., through a user interface) or be received from a computer application. In addition, the query can be natural language word search. Documents are obtained that satisfy the query (step 404). In one implementation, the documents that satisfy the query are obtained through a search engine using a search index (e.g., search index 116). A facet hierarchy is created (e.g., through facet service 108) based on the documents that satisfy the query (step 306). In one implementation, the search engine returns the results (i.e., documents that satisfy the query) organized in a facet tree structure (e.g., a facet hierarchy as shown in FIG. 2A), and the documents with corresponding feature tags.

A determination is made whether a pre-defined cube structure (or static cube) is available (step 408). If a pre-defined cube structure is available, a determination is made whether the pre-defined cube structure corresponds to the facet hierarchy (step 410). In one implementation, if the user issues a natural language/word search, or selects a measure-based facet member, the facet tree which is returned as a search result is traversed to identify relevant members to write a multi-dimensional expression (MDX) query to slice the cube dimensions of the static cube. In one implementation, the fact keys that are attached to the result documents as features are used to select the relevant measure values from a fact table. Note: for other types of queries (e.g., where no search or measure-based facets are involved) serving the query can be performed with standard MDX features.

In some cases, however, the search result may not map to the cube cell boundaries of a given static cube, which boundaries only reflect dimensions, and not measure ranges. Therefore, in such cases it is not possible to use previously calculated aggregations. Accordingly, if the pre-defined cube structure does not correspond to the facet hierarchy, the pre-defined cube structure is modified to correspond with the facet hierarchy (step 412). In one implementation, this step includes identifying the relevant cube members by rewriting the (MDX) query to match the facet result categories. In addition, current values of a data row for each measure used in the cube definition are determined through the compound keys available through the feature tags of a document, and the measure aggregates for the members in the result set are re-calculated and stored in the appropriate cube cells. Note: if the facet definitions are restricted to dimension levels available in the cube, and do not contain a measure-based facet or other cube cell boundary-changing element, compound key tagging is not necessary. A query can be answered by mapping the facet categories from the search results to the proper cube dimension levels by rewriting the MDX query to include only the members contained in the search result. A multi-dimensional search interface (e.g., an OLAP interface) is displayed based on the modified cube structure (step 414).

Referring back to step 410, if the pre-defined cube structure does correspond to the facet hierarchy, a multi-dimensional search interface (e.g., an OLAP interface) can be displayed based on the original pre-defined cube structure (step 416). The user can continue to change the scope of results by issuing another natural language query, or by selecting one of the subfacets from the facet tree, or by performing drill-down, drill-up, or slice-and-dice operations in the multi-dimensional search interface. Also, referring back to step 408, if a pre-defined cube structure is not available, a cube structure that corresponds with the facet hierarchy is created (step 418). A multi-dimensional search interface (e.g., an OLAP interface) is displayed based on the created cube structure (step 414) together with a flexibly ordered dynamic search interface representing the facet groups.

Figure 5:
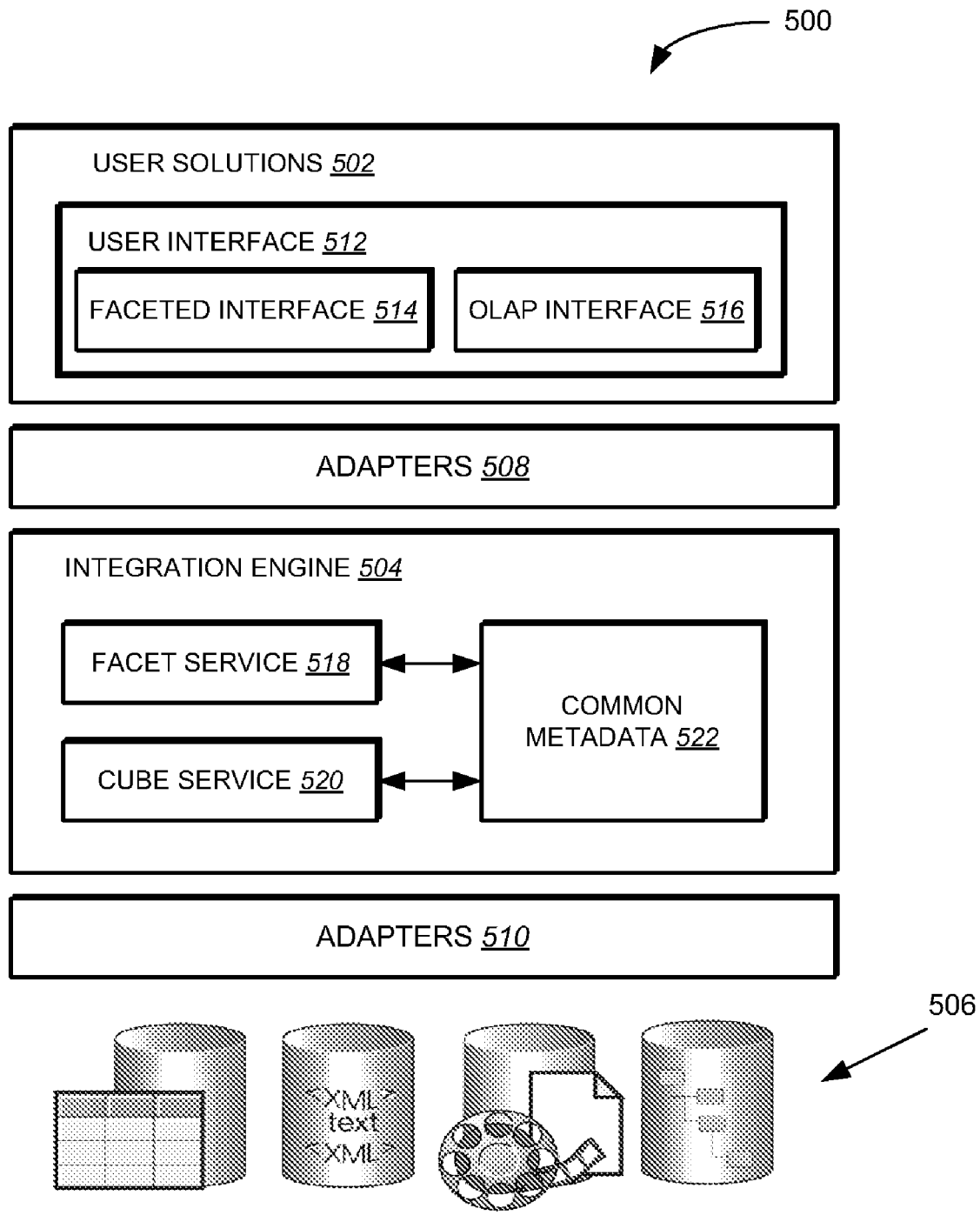
FIG. 5 illustrates components of a computer system in accordance with one implementation of the invention.

FIG. 5 illustrates a data processing system 500 in accordance with one implementation of the invention. The data processing system 500 includes user solutions 502, an integration engine 504, and a data set 606. In one implementation, the data processing system 500 further includes adapters 508, 510 that respectively decouple the user solutions 502 from the integration engine 504 and decouple the integration engine 504 from the data set 606. Such an implementation provides for a plug-in approach for the combination of different components to deliver requested features of a given application.

Figure 6:
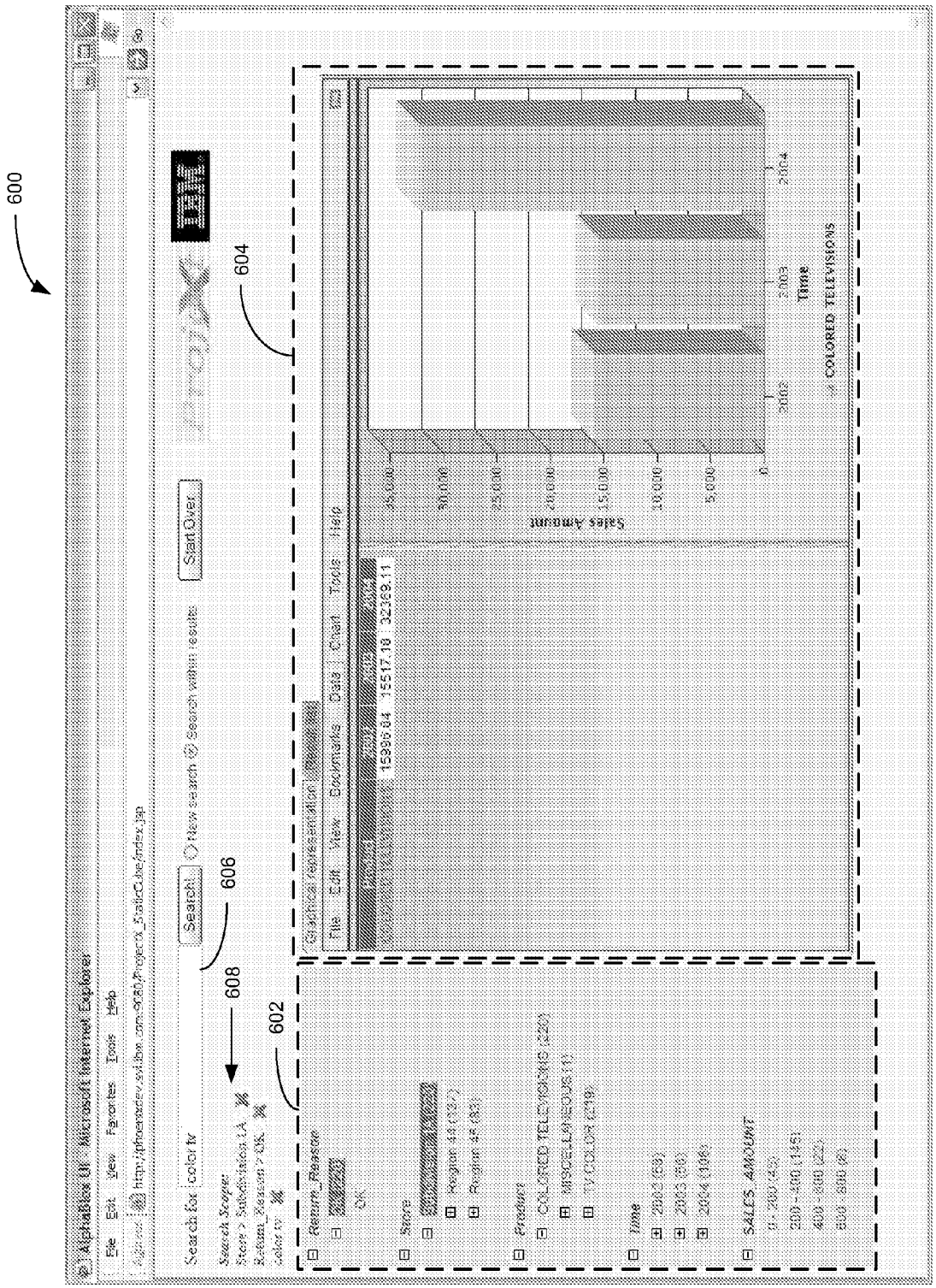
FIG. 6 illustrates an example user interface for receiving user input issuing a query.

In one implementation, the user solutions 502 include a user interface 512 that is, for example, displayable on a display associated with the data processing system 500. In one implementation, the user interface 512 includes a faceted interface 514 and an OLAP interface 516. FIG. 6 illustrates an example user interface 600 including a faceted interface 602 and an OLAP interface 604. As shown in the example of FIG. 6, the faceted interface 602 and the OLAP interface 604 display results associated with a natural language search for "color tv" in a search field 606. The user interface 512 can further include a search scope 608 that indicates the navigation and drill path within the faceted interface 514. The faceted interface 602 includes a plurality of facets including "Return_Reason", "Store", "Product", "Time", and "SALES_AMOUNT". Each of these facets has corresponding child facets. For example, the "Time" facet includes child facets "2002", "2003", and "2004". Adjacent to the child facets in the faceted interface 602 is a number in parenthesis. In one implementation, the number represents the number of documents classified by the facet. The facets can be represented as dimensions in the OLAP interface 604.

Referring back to FIG. 5, in one implementation, the integration engine 504 includes a facet service 518 and a cube service 520. The facet service 518 is operable to construct a facet hierarchy based on documents that satisfy a search query. In one implementation, the facet service 518 constructs a facet hierarchy based on metadata associated with the documents that satisfy a search query. The cube service 520 is operable to create a cube structure based on the facet hierarchy or map the facet hierarchy to an existing (static) cube structure, as previously discussed above. In one implementation, a common data structure (represented by common metadata 522) is used for communication between the components, in particular to ensure a consistent definition for facets and cube dimensions. The data set 506 can include any number and different types of data sources, including structured and unstructured data. In one implementation, one or more search indexes are created for data contained within the data set 506. The search indexes can be annotated with metadata that describes a hierarchical relationship between the data. Accordingly, the data processing system 500 is operable to combine the navigational paradigms of cube-based online analyses with a faceted search to improve user access to data.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 7:
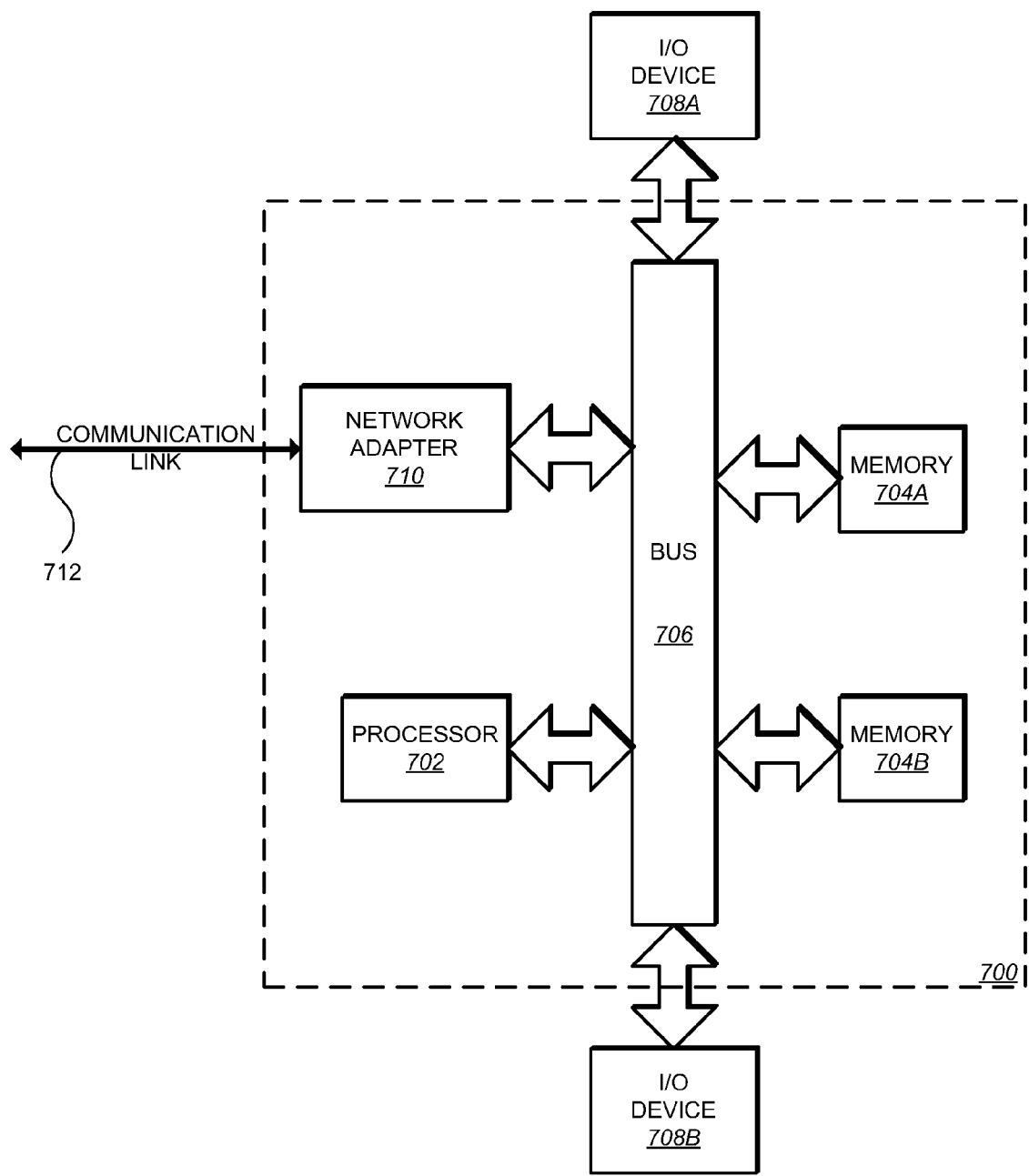
FIG. 7 is a block diagram of a data processing system suitable for displaying results of a search query in accordance with one implementation of the invention.

FIG. 7 illustrates a data processing system 700 suitable for storing and/or executing program code. Data processing system 700 includes a processor 702 coupled to memory elements 704A-B through a system bus 706. In other implementations, data processing system 700 may include more than one processor and each processor may be coupled directly or indirectly to one or more memory elements through a system bus. Memory elements 704A-B can include local memory employed during actual execution of the program code, bulk storage, and cache memories that provide temporary storage of at least some program code in order to reduce the number of times the code must be retrieved from bulk storage during execution. As shown, input/output or I/O devices 708A-B (including, but not limited to, keyboards, displays, pointing devices, etc.) are coupled to data processing system 700. I/O devices 708A-B may be coupled to data processing system 700 directly or indirectly through intervening I/O controllers (not shown).

In one implementation, a network adapter 710 is coupled to data processing system 700 to enable data processing system 700 to become coupled to other data processing systems or remote printers or storage devices through communication link 712. Communication link 712 can be a private or public network. Modems, cable modems, and Ethernet cards are just a few of the currently available types of network adapters.

Various implementations for performing a search query have been described. Nevertheless, various modifications may be made to the implementations. For example, though the techniques described above refer to a cube structure, any multi-dimensional data structure can be used to as a source from which to display a multi-dimensional search interface. In addition, steps of the methods described above can be performed in a different order and still achieve desirable results. Accordingly, many modifications may be made without departing from the scope of the following claims.

What is claimed is:

1. A computer-implemented method for displaying results of a search query, the method comprising:
   receiving a query;
   obtaining documents that satisfy the query;
   constructing, by operation of one or more computer processors, a facet hierarchy based on the documents that satisfy the query;
   creating a cube structure based on the facet hierarchy; and
   outputting for display a multi-dimensional search interface based on the cube structure.

2. The method of claim 1, wherein obtaining documents that satisfy the query includes using a search index to obtain the documents, the search index storing information relating to a plurality of documents, the information including metadata describing a hierarchical relationship among the plurality of documents.

3. The method of claim 2, wherein constructing a facet hierarchy includes constructing a facet hierarchy based on the metadata describing the hierarchical relationship associated with the documents that satisfy the query.

4. The method of claim 3, wherein the multi-dimensional search interface comprises an OLAP (Online Analytical Processing) interface.

5. The method of claim 3, wherein:
   the facet hierarchy includes a plurality of facets; and
   creating the cube structure comprises creating dimensions for the cube structure based on the plurality of facets.

6. The method of claim 5, wherein:
   creating the cube structure further comprises populating the cube structure with a plurality of measures, each measure being categorized by one or more dimensions of the cube, wherein each measure of the cube structure is based on documents classified by facets that correspond to the one or more dimensions categorizing the measure.

7. The method of claim 6, wherein outputting the multi-dimensional search interface comprises constructing a multidimensional search query on the cube structure to select measures for display in the multidimensional search interface, the selected measures being based on the documents that satisfy the query.

8. The method of claim 7, further comprising outputting for display a faceted search interface based on the facet hierarchy.

9. The method of claim 8, wherein:
receiving the query comprises receiving user input issuing a natural language word search through a user interface; and
the faceted search interface and the multi-dimensional search interface are displayed in the user interface.

10. The method of claim 7, further comprising:
receiving a second query; and
responsive to receiving the second query updating or deleting the cube structure.

11. A computer-implemented method for displaying results of a search query, the method comprising:
receiving a query;
obtaining documents that satisfy the query using a search index, the search index storing information relating to a plurality of documents, the information including metadata describing a hierarchical relationship among the plurality of documents;
constructing, by operation of one or more computer processors, a facet hierarchy based on the metadata describing the hierarchical relationship associated with the documents that satisfy the query;
determining whether a pre-defined cube structure corresponds to the facet hierarchy; and
responsive to the pre-defined cube structure not corresponding to the facet hierarchy, modifying the pre-defined cube structure to correspond with the facet hierarchy and outputting for display a multi-dimensional search interface based on the modified cube structure.

12. The method of claim 11, further comprising:
responsive to the pre-defined cube structure corresponding to the facet hierarchy, outputting for display the multi-dimensional search interface based on the pre-defined cube structure.

13. The method of claim 12, wherein the multi-dimensional search interface comprises an OLAP (Online Analytical Processing) interface.

14. The method of claim 12, wherein:
the facet hierarchy includes a plurality of facets;
the pre-defined cube structure includes pre-defined dimensions; and
determining whether the pre-defined cube structure corresponds to the facet hierarchy comprises determining whether each facet of the facet hierarchy maps to a pre-defined dimension of the pre-defined cube structure.

15. The method of claim 14, wherein:
the pre-defined cube structure further includes a plurality of pre-defined measures; and
modifying the pre-defined cube structure comprises re-calculating a pre-defined measure based on the documents that satisfy the query.

16. The method of claim 14, further comprising outputting for display a faceted search interface based on the facet hierarchy.

17. The method of claim 16, wherein:
receiving the query comprises receiving user input issuing a natural language word search through a user interface; and
the faceted search interface and the multi-dimensional search interface are displayed in the user interface.

18. A computer readable storage medium containing program instructions, tangibly stored thereon, for displaying results of a search query, the program instructions comprising instructions for:
receiving a query;
obtaining documents that satisfy the query;
constructing a facet hierarchy based on the documents that satisfy the query;
creating a cube structure based on the facet hierarchy; and
outputting for display a multi-dimensional search interface based on the cube structure.

19. The computer readable storage medium of claim 18, wherein the instructions for obtaining documents that satisfy the query include instructions for using a search index to obtain the documents, the search index storing information relating to a plurality of documents, the information including metadata describing a hierarchical relationship among the plurality of documents.

20. The computer readable storage medium of claim 19, wherein the instructions for constructing a facet hierarchy include instructions for constructing a facet hierarchy based on the metadata describing the hierarchical relationship associated with the documents that satisfy the query.

21. The computer readable storage medium of claim 20, wherein the instructions for outputting the multi-dimensional search interface comprise instructions for outputting an OLAP (Online Analytical Processing) interface.

22. The computer readable storage medium of claim 20, wherein:
the facet hierarchy includes a plurality of facets; and
the instructions for creating the cube structure comprise instructions for creating dimensions for the cube structure based on the plurality of facets.

23. The computer readable storage medium of claim 22, wherein:
the instructions for creating the cube structure further comprise instructions for populating the cube structure with a plurality of measures, each measure being categorized by one or more dimensions of the cube, wherein each measure of the cube structure is based on documents classified by facets that correspond to the one or more dimensions categorizing the measure.

24. A computer readable storage medium containing program instructions, tangibly stored thereon, for displaying results of a search query, the program instructions comprising instructions for:
receiving a query;
obtaining documents that satisfy the query using a search index, the search index storing information relating to a plurality of documents, the information including metadata describing a hierarchical relationship among the plurality of documents;
constructing a facet hierarchy based on the metadata describing the hierarchical relationship associated with the documents that satisfy the query;
determining whether a pre-defined cube structure corresponds to the facet hierarchy; and
responsive to the pre-defined cube structure not corresponding to the facet hierarchy, modifying the pre-defined cube structure to correspond with the facet hierarchy and outputting for display a multi-dimensional search interface based on the modified cube structure.

25. The computer readable storage medium of claim 24, further comprising instructions for outputting the multi-dimensional search interface based on the pre-defined cube structure responsive to pre-defined cube structure corresponding to the facet hierarchy.

26. The computer readable storage medium of claim 25, wherein:
- the facet hierarchy includes a plurality of facets;
- the pre-defined cube structure includes pre-defined dimensions; and
- the instructions for determining whether the pre-defined cube structure corresponds to the facet hierarchy include instructions for determining whether each facet of the facet hierarchy maps to a pre-defined dimension of the pre-defined cube structure.

27. The computer readable storage medium of claim 26, wherein:
- the pre-defined cube structure further includes a plurality of pre-defined measures; and
- the instructions for modifying the pre-defined cube structure include instructions for re-calculating a pre-defined measure based on documents that satisfy the query.

28. A data processing system for displaying results of a search query, the data processing system comprising:
- one or more computer processors;
- a user interface to receive a query;
- a search engine to obtain documents that satisfy the query;
- a facet service to construct, by operation of the one or more computer processors, a facet hierarchy based on the documents that satisfy the query;
- a cube service to create a cube structure based on the facet hierarchy; and
- a multi-dimensional search interface to display data associated with the documents that satisfy the query, the data being displayed based on the cube structure.

29. A data processing system for displaying results of a search query, the data processing system comprising:
- one or more computer processors;
- a user interface to receive a query;
- a search engine to obtain documents that satisfy the query;
- a facet service to construct, by operation of the one or more computer processors, a facet hierarchy based on documents that satisfy the query;
- a cube service to determine whether a pre-defined cube structure corresponds to the facet hierarchy, wherein responsive to pre-defined cube structure not corresponding to the facet hierarchy, the cube service modifies the pre-defined cube structure to correspond with the facet hierarchy; and
- a multi-dimensional search interface to display data associated with the documents that satisfy the query based on the modified cube structure.

30. The data processing system of claim 29, wherein responsive to pre-defined cube structure corresponding to the facet hierarchy, the multi-dimensional search interface displays data associated with the documents that satisfy the query based on the pre-defined cube structure.

* * * * *